United States Patent [19]
Reits

[11] Patent Number: 5,877,855
[45] Date of Patent: Mar. 2, 1999

[54] ARRANGEMENT FOR THE DETECTION OF TARGETS

[75] Inventor: Bernard Jozef Reits, Hengelo, Netherlands

[73] Assignee: Hollandse Signaalapparaten B.V., Hengelo, Netherlands

[21] Appl. No.: 894,810

[22] PCT Filed: Mar. 1, 1996

[86] PCT No.: PCT/EP96/00916

§ 371 Date: Sep. 4, 1997

§ 102(e) Date: Sep. 4, 1997

[87] PCT Pub. No.: WO96/27805

PCT Pub. Date: Sep. 12, 1996

[30] Foreign Application Priority Data

Mar. 6, 1995 [NL] Netherlands ............................ 9500432

[51] Int. Cl.[6] ................. G01B 11/26; G01J 5/02
[52] U.S. Cl. .................................... 356/141.4; 356/141.5; 250/342
[58] Field of Search ................................. 356/3.14, 3.15, 356/3.16, 141.4, 141.5; 250/342

[56] References Cited

U.S. PATENT DOCUMENTS

| | | | |
|---|---|---|---|
| 2,830,487 | 4/1958 | Griffith . | |
| 3,687,556 | 8/1972 | Price et al. | 356/141.4 |
| 5,000,564 | 3/1991 | Ake | 356/3.16 |
| 5,026,153 | 6/1991 | Suzuki et al. | 356/3.16 |

*Primary Examiner*—Stephen C. Buczinski
*Attorney, Agent, or Firm*—Oblon, Spivak, McClelland, Maier & Neustadt, P.C.

[57] ABSTRACT

An arrangement for detecting targets with an infrared sensor. The number of false alarms can be reduced by comparing image matrices generated by a detector in one revolution on the basis of pre-alarms generated in the image matrices by point target extractors. Between the matrices generated in succession, differences are introduced by means of a different spectral response, polarization section and parallax.

13 Claims, 2 Drawing Sheets

ARRANGEMENT FOR THE DETECTION OF TARGETS

BACKGROUND OF THE INVENTION

1. Field of the Invention

The present invention relates to an arrangement for the detection of targets, comprising a detector unit rotatable about an at least substantially vertical search axis, provided with a detector and focusing means for the focusing onto the detector of radiation, such as infrared radiation emitted or reflected by targets, further comprising a point target extractor, operating on a row of two-dimensional image matrices $X_1$, $X_2$, . . . generated by the detector and representing the surroundings of the arrangement, for generating a predetection for each point target detected in one of the image matrices $X_1$, $X_2$, . . .

2. Discussion of the Background

An arrangement of this type is known for example from EP-B- 0.205.794. The aim of the point target extractor is to reduce the number of false alarms generated by a detector unit. Without a point target extractor, a detector unit will generally generate thousands of false alarms per revolution. If the point target extractor possesses all features known in the art, this number can be reduced to only a few false alarms per revolution. This, however, still renders the arrangement unfit for the autonomous and automatic operation of a weapon system.

SUMMARY OF THE INVENTION

The number of false alarms can be reduced by requiring a predetection to be observed during a number of consecutive revolutions. This has the drawback that valuable reaction time is lost. The arrangement according to the invention obviates this drawback and is characterized in that the detector unit is designed to generate, per revolution, at least two image matrices and in that a combination circuit has been provided to generate a detection if, for the at least two image matrices, predetections are generated for corresponding matrix elements.

A first embodiment of the arrangement according to the invention is characterized in that the detector unit comprises a first detector for the generation, per revolution, of an image matrix $X_i$ and a second detector for the generation, per revolution, of an image matrix $Y_i$, the elevation directions and angles of aperture of both detectors at least substantially corresponding and in that the combination circuit generates a detection if at least two predetections for corresponding matrix elements in the row $X_i$, $Y_i$, $X_{i+1}$, $Y_{i+1}$, . . . of image matrices are generated in succession.

In this respect it is of advantage if both detectors, despite the fact that their elevation directions and opening angles correspond, yet observe a potential target in different ways. A favourable embodiment is therefore characterized in that the spectral response of the first detector differs from that of the second detector. Taking account of the spectral windows in the atmosphere, a special embodiment is characterized in that the spectral sensitivity of the first detector exhibits a maximum in the 3–5 micrometer range and the second detector in the 8–12 micrometer range.

A further favourable embodiment makes use of the fact that false alarms, particularly those caused by for instance sunlight reflected by the sea surface, exhibit a preference for certain polarization directions and is characterized in that the first detector and the second detector comprise a polarizer each. A special embodiment is then characterized in that at least one polarizer is provided with adjusting means for orientating the polarizer such that the number of prealarms is minimized.

A still further embodiment of the invention serves a useful purpose if false alarms are generated by nearby objects, such as birds. It is characterized in that the first and the second detector are positioned side by side to generate a parallax difference for at least nearby targets thus causing the point target extractors to generate prealarms for non-identical matrix elements, which will subsequently not be combined to a detection by the combination circuit.

According to a further inventive embodiment of the invention it is possible, at least for a selected azimuth sector, to generate two image matrices per revolution by means of only one detector. This requires the detector unit to be mounted such that it is capable of rotation about an elevation axis which is positioned at least substantially perpendicular to the search axis and to the detector line of sight. The inventive embodiment is then characterized in that, after the generation of each image matrix, a rotation round the elevation axis is made such that the next image matrix of the selected azimuth sector can be generated after half a revolution about the search axis.

In an exceptionally favourable embodiment, an arrangement based on such a design is characterized in that the detector is positioned aside the reference axis to generate a parallax difference for at least nearby targets in the image matrices generated in succession.

BRIEF DESCRIPTION OF THE DRAWINGS

The invention will now be described with reference to the following figures, of which.

DISCUSSION OF THE PREFERRED EMBODIMENTS

Figure 1:
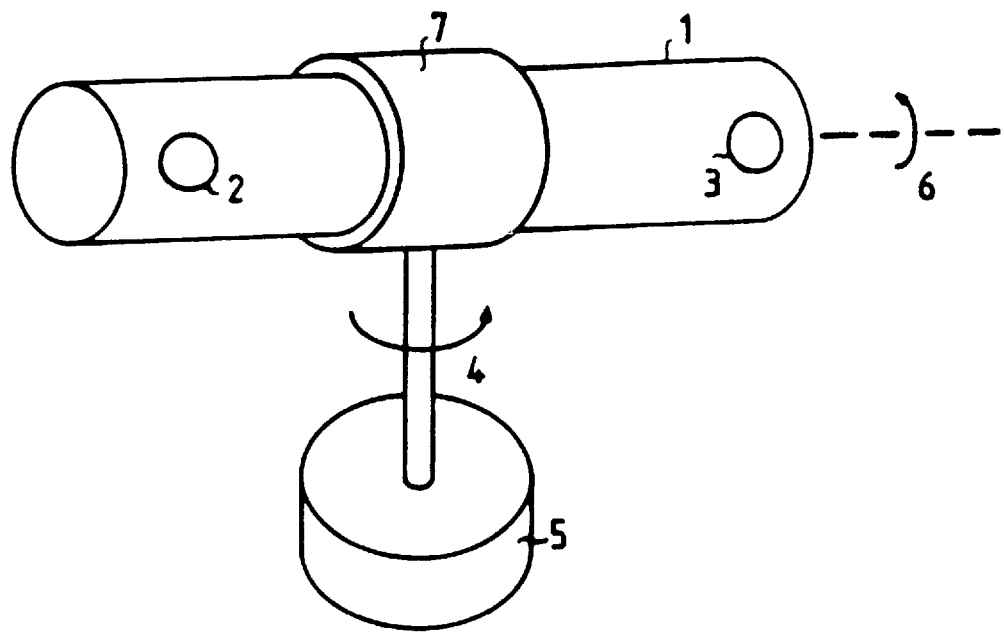
FIG. 1 represents a possible embodiment of the invention.

FIG. 1 shows a possible embodiment of the arrangement according to the invention, in which a detector unit 1 is provided with two windows 2, 3, behind which detectors are placed to receive radiation emitted or reflected by targets. During operation, detector unit 1 rotates about a vertical search axis 4 which ends in a pedestal 5. If the invention is used on a moving vehicle, for instance a ship, pedestal 5 is generally mounted on a stabilized platform not shown here. Pedestal 5 contains both the drive required for the rotation of search axis 4 and a rotary joint (not shown) for the supply of command signals and the connection of supply voltages and for the output of signals generated by the detectors. A further advantageous measure is to position detector unit 1 such that it is capable of rotation about an elevation axis 6, which allows observation under a preselected elevation direction. In its most simplified embodiment, detector unit 1 is arranged such that elevation drive 7 rotates both detectors simultaneously which causes their elevation directions to correspond invariably.

Figure 2:
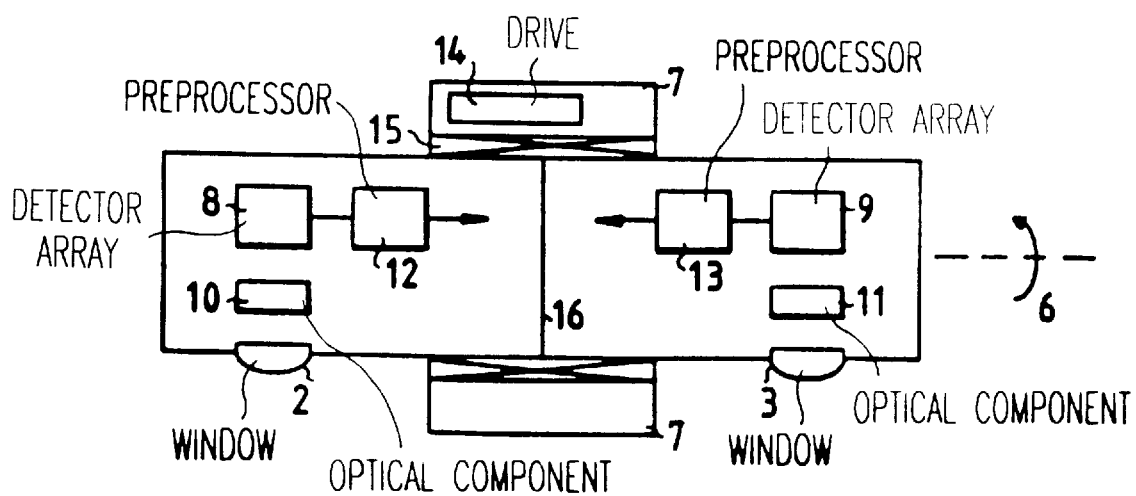
FIG. 2 schematically represents a possible construction of the invention.

FIG. 2 schematically represents a horizontal cross-section of a possible construction of detector unit 1 in which the windows 2, 3 are arranged as lenses which, in addition to a sufficient sealing of the interior of detector unit 1, also provide the image formation of the surrounding area to the detectors 8, 9. Additional optical components 10, 11, such as automatic diaphragms and polarizers, can be positioned between windows 2, 3 and detectors 8, 9. The detectors 8, 9 may of course be suitable for any wavelength capable of penetrating the atmosphere. As regards the present invention, the detectors 8, 9 are sensitive to infrared radiation and are arranged as linear arrays whose longitudinal axis is approximately parallel to search axis 4. For an infrared application, the lenses 2, 3 are preferably designed in single-crystal germanium. Each revolution, detector 8 can generate an image matrix $X_i$ of the entire or partial surrounding area, such as a selected azimuth sector, one dimension in the image matrix resulting from the linear array as such and the other dimension representing the azimuth direction of a target derived from the scanning movement resulting from the rotation about search axis 4. In like manner, detector 9 generates an image matrix $Y_i$. Via preprocessors 12, 13, search axis 4 and a rotary joint in pedestal 5, the output signals of detectors 8, 9 are supplied to a below deck processor for further processing. Preprocessors 12, 13 comprise functions well-known in the art such as the pre-amplification and filtering of detector-generated signals, the multiplexing of these signals to enable their transport through the rotary joint and, if necessary, the control of the additional optical components.

Elevation drive 7 comprises drive means 14 and a bearing 15 which in unison enable the rotation of detector unit 1 about elevation axis 6. It may be advantageous to divide detector unit 1 according to the dividing plane 16 and to provide both subdetector units with an individual elevation drive. This provides the option to either select equal elevation directions of detectors 8, 9, so that they will both scan at least substantially the same azimuth, or to select the elevation directions such that opposite azimuth directions are scanned.

Figure 3:
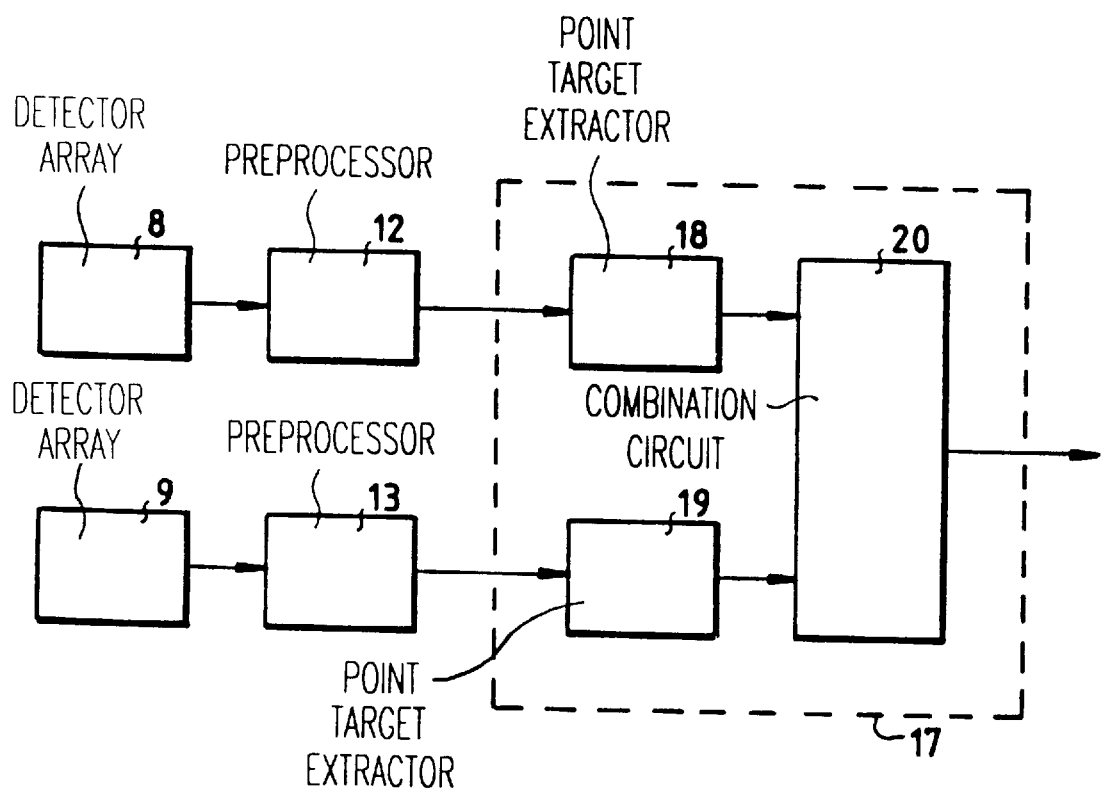
FIG. 3 represents a block diagram of the invention.

FIG. 3 represents a possible block diagram of the invention, in which detectors 8, 9 supply their data to a processor 17 via preprocessors 12, 13. Processor 17, a digital signal processor, comprises a point target extractor 18 known in the art which generates a predetection at its output in the event of a detection of a point target in the image matrix $X_i$ generated by the detector 8 per revolution or per selected azimuth sector. Processor 17 furthermore comprises a second, generally identical point target extractor 19 which generates a predetection at its output in the event of a detection of a point target in the image matrix $Y_i$ generated by detector 9 per revolution or per selected azimuth sector. The predetections generated by the point target extractors 18, 19 are then combined in a combination circuit 20 in such a way that a detection is generated at the output of combination circuit 20 if for two corresponding matrix elements a predetection is generated in the image matrices $X_i$ and $Y_i$, which means that the two detectors observe a target in the same direction.

Such a dual detector and combination circuit coupled thereto reduces the false-alarm probability owing to the fact that a predetection caused by for instance noise will not result in a detection, while the reaction time is not adversely affected. A further reduction of the false-alarm probability can be effected by selecting different types of detectors so that they will react differently to for instance the reflection of sunlight on water. This reduces the risk of both point target extractors generating a predetection in such a situation. A particularly advantageous option in this context is the selection of a different spectral response for the two detectors, taking into account the spectral windows in the atmosphere. The desired effect is reached by selecting the sensitivity of detector 8 in the 3–5 micron range and of detector 9 in the 8–12 micron range. Combination circuit 20 can be enhanced by generating a detection only if the intensities of the two corresponding matrix elements associated with predetections relate to each other in a way that corresponds with those of an expected target. This is for example based on the assumption that the target is a missile of which the nose cone has a higher temperature than the surrounding area as a result of skin-heating. The way in which the intensities of the infrared radiation for the two different spectral fields relate to each other can then be derived from the nose cone temperature known in the art.

A further simple and effective measure to effect a different response for both detectors is by fitting additional optical components 10, 11 with polarizers, which may be for instance be orientated orthogonally. To ensure an optimal operation, at least one polarizer is adjustable, for instance through a powered mechanism which in the operational mode orientates the polarizer such that the number of prealarms per revolution is minimized. Particularly false alarms caused by the reflection of sunlight on water are thus effectively suppressed.

A further problem well-known in the art, i.e. false alarms caused by birds flying in the vicinity of the arrangement, is effectively counteracted by the arrangement as, owing to the parallax difference, the birds give rise to predetections for different matrix elements in the matrices $X_i$ and $Y_i$, as a result of which combination circuit 20 will not generate a detection. It may occasionally be disadvantageous if both detectors have different spectral responses. This can, at least for a selected azimuth sector, be obviated by, after generating the matrices $X_i$, $Y_i$, rotating the detector unit 1 about the elevation axis 6 such that the matrices $X_i$, $Y_i$ are again determined after approximately half a revolution, after which process the detectors 8, 9 have effectively changed places. This results in the availability of four matrices per revolution which, in corresponding spectral ranges, can be combined in pairs in combination circuit 20. Furthermore, the ratios of the intensities can again be compared for the different spectral ranges. Due account has to be paid to the fact that the matrices thus alternately generated by a detector are always a mirror image of previously generated matrices.

Point target extractors 18, 19 may be combined to one point target extractor which, on a time-sharing basis, alternately processes the output signals of detectors 8, 9. It is also possible to omit detector 9 and preprocessor 13, by rotating detector unit 1 about the elevation axis each half-revolution. This yields two matrices per revolution which exhibit a parallax difference; this prevents false alarms originating from nearby objects. It is furthermore possible to change the polarization direction and/or to vary the spectral sensitivity, which enables all said improvements to be realised on the basis of only one detector, although this only applies to a selected azimuth sector smaller than 180 degrees.

I claim:

1. An apparatus for detection of targets, comprising:
    a detector unit, arranged to rotate about a substantially vertical search axis, including,
    at least one detector,
    focusing means for focusing, onto the at least one detector, radiation emitted or reflected by the targets,
    a point target extractor, operating on a row of at least two, two-dimensional, image matrices $X_i$, $Y_i$, generated by the at least one detector and representing detected surroundings of the apparatus, for generating a predetection for each of point targets detected in one of the at least two image matrices $X_i$, $Y_i$, and
    a combination circuit;

wherein the detector unit is configured to generate, per each revolution around the search axis, the at least two image matrices, and the combination circuit is provided to generate a detection if, for the at least two image matrices, two predetections are generated for corresponding matrix elements.

2. The apparatus of claim 1, wherein the at least one detector comprises:

a first detector for the generation, per each revolution around the search axis, of image matrix $X_i$, and a second detector for the generation, per revolution around the search axis, of the image matrix $Y_i$, wherein elevation directions and angles of aperture of both the first and second detectors are substantially the same and the combination circuit generates a detection if at least two predetections for corresponding matrix elements in a row $X_i$, $Y_i$, $X_{i+1}$, $Y_{i+1}$ of the image matrices $X_i$, $Y_i$, are generated in succession.

3. The apparatus of claim 2, wherein the spectral response of the first detector differs from that of the second detector.

4. The apparatus of claim 3, wherein the spectral sensitivity of the first detector and the second detector exhibits a maximum in the 3–5 micrometer range and 8–12 micrometer range, respectively.

5. The apparatus of claim 2, wherein the first detector and the second detector each comprise at least one polarizer.

6. The apparatus of claim 5, further comprising an adjusting means for orientating the at least one polarizer such that a number of prealarms is minimized.

7. The apparatus of claim 2, wherein the first and the second detector are positioned side by side for generating a parallax difference for at least nearby targets.

8. The apparatus of claim 1, wherein the detector unit is mounted rotatably around an elevation axis which is at least substantially perpendicular to the search axis and to a line of sight of the at least one detector.

9. The apparatus of claim 8, wherein the at least one detector comprises one detector for generating, per each revolution around the search axis, the two image matrices of a selected azimuth sector, and the detector unit is configured to rotate around an elevation axis after the generation of each image matrix of the two image matrices in such a way that a next image matrix of the selected azimuth sector can be generated after a half revolution about the search axis.

10. The apparatus of claim 9, wherein the detector is positioned aside a reference axis for generating a parallax difference for at least nearby targets in the image matrices generated in succession.

11. The apparatus claim 10, wherein the detector unit comprises a polarizer and the detector unit includes means for adjusting the polarizer for each generated image matrix.

12. The apparatus claim 10, wherein the detector unit comprises filters placed before the detector for each generated image matrix.

13. The apparatus claim 11, wherein the detector unit comprises filters placed before the detector for each generated image matrix.

* * * * *